Oct. 18, 1932.  E. SCHIMANEK  1,882,971
ENGINE FOR MOTOR VEHICLES
Filed May 28, 1927
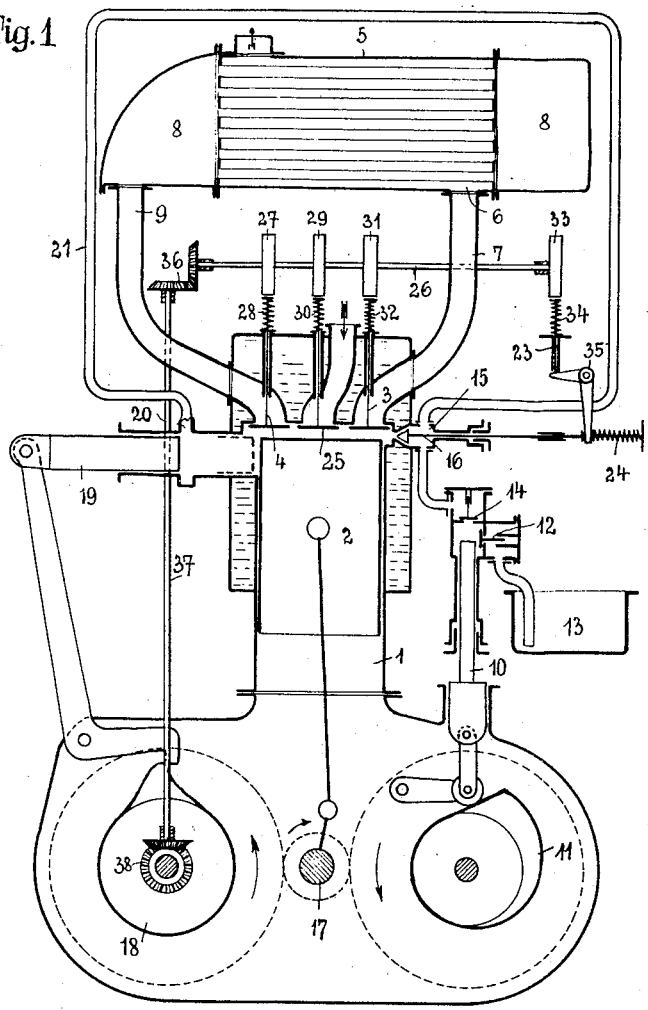
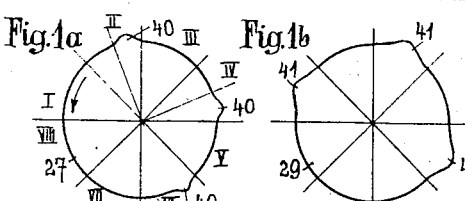
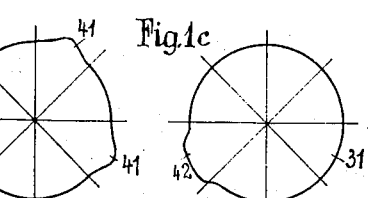
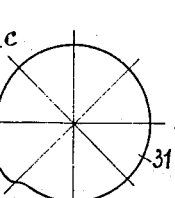
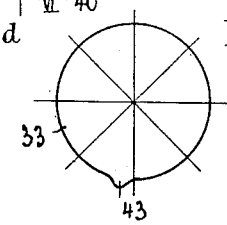
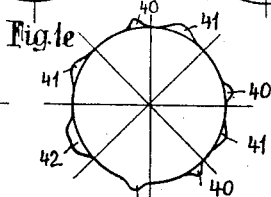
Inventor,
Emil Schimanek,
By Charles W. Hills,
Attorneys.

Patented Oct. 18, 1932

1,882,971

UNITED STATES PATENT OFFICE

EMIL SCHIMANEK, OF BUDAPEST, HUNGARY

ENGINE FOR MOTOR VEHICLES

Application filed May 28, 1927, Serial No. 194,920, and in Austria October 19, 1926.

This invention relates to an engine for motor vehicles.

In the known high-speed engines for motor vehicles, there is a limit to the increased output obtainable by increasing the speed, since the higher the engine speed, the smaller is the size of the cylinders, and therefore the smaller the amount of fuel that can be admitted into the combustion chamber. In the case of internal combustion engines of the Diesel type which are not provided with a separate compressor, various difficulties arise at high speeds, especially the course of combustion being substantially influenced thereby, mainly for the following reasons:

1. The fuel pump works irregularly, because a. The quantity of fuel to be admitted at each stroke varies inversely with the speed, and the plunger and valves of the pump serving to supply these small quantities must be of such small dimensions that the amount to be delivered per stroke is substantially adversely influenced and in a continually varying manner, both in consequence of the changes in volume of the liquid under the considerable differences in pressure, and also by the movement of the valve and by the leakages; and because b. The movement of the valve especially in cases where the same is of small dimensions becomes irregular when a certain speed is exceeded, and this influence varies, in a manner that cannot be determined in advance but in any event becomes greater, the smaller the dimensions of the pump, and because c. The delivery of the fuel cannot be regulated with the necessary precision either by influencing the movement of the valve or by modifying the stroke of the pump.

2. Owing to the smaller nozzles needed for the small quantities of fuel, the risk of obstruction in the fuel nozzle is greater.

3. The combustion of the injected fuel cannot proceed with the rapidity needed for obtaining good thermal efficiency, owing to the size of the compression space—which, for constructional reasons, cannot be carried below a certain limit—and the consequently limited final temperature of compression.

Hence, for example in Diesel engines, limits are naturally imposed on the increase in the engine speed, these limits being due, in part, to the fact that the fuel pump can only be of such dimensions and work at such speeds that it can inject the requisite amount of fuel—which must also be capable of accurate adjustment—in a regular and uniform manner at each stroke. The speeds now customary, however, already exceed the speed at which the use of the existing fuel pumps is practicable.

According to the invention, high-speed vehicle engines for speeds, mounting to a multiple of those hitherto possible are arranged to run on an interval comprising more than four strokes per cycle, that is to say, a cycle of operation consisting of more than four strokes in which each combustion stroke is preceded by more than one suction stroke for air for use in the combustion, for example as six-stroke-cycle motor, eight-stroke-cycle motor and so on. These systems in excess of a four-stroke-cycle, for example a six-stroke-cycle, eight-stroke-cycle and so on, are particularly advantageous for application to high-speed Diesel engines. For these engines, a system exceeding the four-stroke-cycle system provides a simple means for diminishing the speed or piston strokes of the pump to a fraction of the speed of the working cylinder and also enables pumps of far higher capacity to be used. Such large low-speed pumps are naturally more reliable in action than small high-speed pumps with small delivery, and they also enable the delivery to be easily regulated. Consequently, a system employing more than four strokes per cycle affords an occasion for equipping high-speed engines with large, low-speed pumps, and enables undisturbed running to be obtained at engine speeds for which the two stroke or four-stroke-cycle injection systems are impracticable. Thus, for example, in the case of a six-stroke-cycle Diesel engine, the pump runs at only one-third the speed (number of strokes) of the working cylinder piston i. e., revolutions of the engine; and, in an eight-stroke-cycle Diesel engine, at only one-fourth the number of strokes of the working cylinder piston; whereas in a two stroke cycle system the number of strokes of the feed pump piston must equal that of the working cylinder piston and, in a four-stroke-cycle system the number of strokes of the pump piston cannot be fewer than one-half the number of piston strokes of the working cylinder. At the same time, in an engine working on the cycle hereinafter described the amount of fuel corresponding to one combustion is twice as great in a six-stroke-cycle system, and three times as great in an eight-stroke-cycle system as in a four-stroke-cycle system; and, according to the invention these large, multiple quantities of fuel can be supplied, i. e. injected, with one stroke of the fuel pump.

The present invention accordingly provides an engine adapted for use on motor vehicles and consisting of an internal combustion engine of the fuel injection type, not provided with a separate compressor and operating on an internal combustion cycle comprising more than four strokes per cycle, in conjunction with fuel pumps of large size and low speed. The invention also enables the difficulties to be surmounted which arise, in the case of high-speed engines, from the circumstance that the dimensions of the working cylinders vary inversely with the speed for which the engine is constructed. It is known that, for constructional reasons, the clearance in small cylinders cannot be made small enough to produce in a four-stroke-cycle system, in which the compression commences at atmospheric pressure, the sufficiently high compression pressure essential for auto-ignition in Diesel engines. A working system comprising more than four cycles, however, will give the same final compression pressure with a very much larger clearance, such a system therefore enabling the engine speed to be increased and higher compression to be nevertheless attained.

In such high-speed engines on a more than four-stroke-cycle system, a small clearance is desirable during that part of each cycle, when the engine is running as a pump or compressor. On the other hand, a small clearance has the drawback of leading to excessive final pressures during the compression stroke preceding the expansion stroke.

This drawback is counteracted by making the clearance space variable in dimensions, for example, by means of an auxiliary piston bounding the clearance and adapted to move so as to increase the clearance space during or at the end of the compression stroke.

In such high-speed engines with more than four strokes per cycle, it is of course, possible to obtain considerably higher degrees of compression than in ordinary four-stroke-cycle engines. In the case of an eight-stroke-cycle engine especially, compression pressures are obtained which may be about treble those in a four-stroke-cycle engine for equal clearance dimensions. This enables a portion of such highly compressed air to be taken from the cylinder and used for injecting the fuel, for example by opening a by-pass duct when the desired injection pressure is reached (i. e. at the end of the sixth stroke in an eight-stroke-cycle engine), which duct establishes communication between the chamber in front of the fuel-injection valve and the cylinder, thus admitting, in front of said valve, highly compressed air serving for injecting or atomizing the fuel.

The by-pass duct can in this case be controlled automatically, in such a manner that, on the injection pressure being reached in the working cylinder, a closure shutting the by-pass duct off from the cylinder opens. The closure preferably takes the form of an auxiliary piston, which may serve at the same time to increase the dimensions of the clearance when the working cylinder is operating as motor cylinder.

In Diesel engines working on a more than four-stroke-cycle system,—which form the subject of the invention—the speed can be further increased by carrying out the method of operation in such a manner that the precompressed combustion air is supplied with heat and that the heat of the gases of combustion are utilized for this purpose.

In such event the method is then carried out by passing the air of combustion drawn in through the suction strokes anterior to the final suction stroke, into heat exchange apparatus which can be arranged to communicate with the working cylinder so as to allow of the admission of the combustion air.

Heating the precompressed air of combustion gives a high final compression temperature of the combustion air, which enables the ignition temperature to be obtained at lower compressions or during unaltered compressions, thus enabling the combustion to proceed more rapidly. Moreover, this heating and utilization of the gases of combustion serves as means for utilizing even bad or inferior fuels in high-speed engines.

In order more clearly to understand the invention reference is made to the accompanying drawing which illustrates diagrammatically and by way of example a typical embodiment of a Diesel eight-stroke-cycle engine for vehicles constructed and operating in accordance with the invention.

In the embodiment illustrated, the piston 2 travels in the engine cylinder 1. Valve 3 is the exhaust valve, valve 4 the by-pass valve. A suction valve 25 is provided in the cover. A receiver 5, consisting of two chambers 6, 8, is connected, as regards the chamber 6, with the chamber behind the valve 3 by means of a branch 7; whilst the chamber 8 is connected with the chamber behind the valve 4 by a branch 9. The piston 10 of the fuel pump is actuated by the cam disc 11 and draws fuel from the tank 13 through the suction valve 12 and delivers said fuel through the valve 14, either direct into the cylinder, or—as shown in the figure—into a fore-chamber 15, which is closed in the direction of the cylinder 1 by a needle valve 16. The cam disc 11 is driven from the main shaft 17 through a pair of pinions with a transmission ratio of 1 to 4.

The engine operates in the following manner:

1. First stroke. Draws in air through the suction valve.

2. Second stroke. Delivers this air through valve 4 into the receiver 5.

3. Third stroke. Draws air in again, as in the first stroke.

4. Fourth stroke. Same as second stroke.

5. Fifth stroke. Air drawn in, once more, as in first stroke.

6. Sixth stroke. As the beginning of this stroke and after the suction valve 25 has been closed, the valve 4 is opened, thereby equalizing the pressure between the receiver 5 and cylinder 1 and admitting into the cylinder three times as much air as would fill it at atmospheric pressure. The temperature of this air is higher than that corresponding to the initial atmospheric temperature, because the air stored in the meantime, in the receiver has absorbed heat there. During the remainder of the sixth stroke the compression in the cylinder takes place.

7. Seventh stroke. This is initiated by the combustion, inasmuch as fuel is injected, either directly into the cylinder by the pump, or an expansion first takes place, the pressure at which the highly-compressed air taken out of the cylinder and trapped in pipe 21 can be used as injection air for introducing and atomizing the fuel. The expansion of the products of combustion then ensues.

8. Eighth stroke. The eighth stroke serves as exhaust stroke, the valve 3 opening and the gases of combustion issuing through the chamber 6 of the receiver 5 into the outer air. This chamber is therefore the exhaust trap of the engine.

In the embodiment illustrated, the injection air is compressed in the working cylinder itself.

During the compression taking place in the sixth stroke the piston 19, actuated by the cam 18, travels outwards and, towards the end of the compression stroke, uncovers the port 20 through which the highly compressed air flows through the pipe 21 into the fore-chamber 15. At the beginning of the seventh stroke, the piston 19 travels towards the right and closes the port 20 trapping compressed air in the pipe 21 and the fore chamber 15, the air expands in the cylinder. At the end of a predetermined portion of the stroke— after the pressure in the cylinder has sunk, through expansion, to a certain pressure somewhat lower in relation to the pressure in the fore-chamber 15—the needle valve opens up communication between the fore-chamber 15 and the cylinder 1, and the fuel is injected by the compressed air trapped in pipe 21 and fore-chamber 15.

This typical embodiment described by way of example, also illustrates the utilization of the piston 19, controlling the injection air, for improving the volumetric efficiency of the engine during the strokes in which the cylinder operates as air pump. During six of the strokes (exhaust, first suction, delivery, second suction, delivery, third suction stroke), the piston 19 occupies the inward position denoted by the dotted line, thereby diminishing the compression space during these strokes and improving the working efficiency during the suction. During the compression stroke, the piston 19 travels into the extreme outward position, shown by the continuous line, and opens up a space sufficient to increase the compression space to just the extent needed for the attainment of the desired final pressure (namely the injection air pressure). It may be mentioned that this pressure may in such case be lower than is usually needed, because the ignition temperature is reached at a lower pressure, owing to the intermediate superheating.

In order to accelerate combustion, the air is heated by the exhaust gases of combustion while stored in the receiver between the suction strokes. In this way, a very high final temperature of compression and consequently of the injection air is attained because the heating prior to compression is multiplied during the compression itself. This high final compression temperature is attained without any unfavourable influence on the volumetric efficiency of the engine during the suction stroke. The high final temperature of the injection air could also be produced by preheating the air prior to its admission into the cylinder; but in such case the volume of air drawn in and treated in the engine would be reduced, and the output would thereby be lessened.

In the hereinbefore described method, the air drawn in at atmospheric temperature is warmed in an intermediate phase in which said heating does not exert any prejudicial influence.

Valves 4, 25, 3 and 16, are operated by cams 27, 29, 31 and 33, respectively, and the cams are driven by gears 36 and 38 through shafts 26 and 37, as shown in the drawing. Figures 1ª, 1ᵇ, 1ᶜ, 1ᵈ and 1ᵉ, indicate the timing sequence of these valves. The valves are spring pressed to the closing position by springs 28, 30, 32 and 24 as shown in the drawing. Valve 16 is operated by cam 33 through a bell-crank 35 and an operating rod 23, which rod is spring-pressed against the cam 33 by spring 34.

What I claim is:

1. An internal combustion engine operating on a cycle comprising an even number of strokes more than four and having a cylinder and a piston reciprocable therein, a fuel receiving chamber in communication with said cylinder, an air receiver having fluid connection with said cylinder and said fuel receiving chamber, air being delivered to said air receiver by said piston and compressed to a pressure higher than the combustion pressure of the engine, valve means in operable connection with said air receiver and said fuel receiving chamber to selectively control flow of air from said receiver and injection of fuel into the cylinder by compressed air, and means operable in timed relation to movement of said piston to move said valve means.

2. An internal combustion engine operating on a cycle comprising a number of strokes more than four, and having a cylinder and a piston reciprocable therein, a fuel receiving chamber in communication with said cylinder, and air receiver in fluid communication with said cylinder and said fuel receiving chamber, valve means in connection with said receiver operable to temporarily entrap air in said receiver delivered thereto by said piston at a pressure higher than the combustion pressure of the engine, and means operable in timed relation to movement of said piston to simultaneously vary the volumetric capacity of said cylinder and control fluid communication between said receiver and said cylinder.

3. An internal combustion engine operating on a cycle comprising an even number of strokes more than four and having a cylinder and a piston reciprocable therein, an air receiver in fluid communication with said cylinder and arranged to store air delivered thereto on several successive compression strokes of said piston, heat exchanger means in said receiver adapted to be heated by the exhaust gases of the engine and to heat the compressed air in the receiver, a fuel receiving chamber in communication with said cylinder, conduit means connecting said receiver and said fuel receiving chamber, valve means adapted to control air flow from said receiver to said fuel chamber, and means operably connected to said piston and said valve means to move said valve means in timed relation to movement of said piston to permit injection of fuel into said cylinder when the pressure in said cylinder has reached a predetermined value on the combustion stroke, and selective movement of compressed air streams into said cylinder.

4. An internal combustion engine with fuel injection operating on a cycle comprising an even number of strokes surpassing four and having a cylinder and a piston reciprocable therein, a fuel receiving chamber in communication with said cylinder, a fuel pump connected to said fuel receiving chamber, an air receiver having fluid connection with said cylinder and said fuel receiving chamber air being sucked into said cylinder, compressed therein, and delivered to said air receiver during the strokes surpassing four and being released from the air receiver into the cylinder during the last compression stroke preceding combustion, means to operate said fuel pump to cause a single fuel delivery stroke per cycle, valve means in operable connection with said air receiver and said fuel receiving chamber to selectively control flow of air from said air receiver into the cylinder, and means operable in timed relation to movement of said piston to move said valve means.

In witness whereof I have hereunto signed my name.

EMIL SCHIMANEK.